United States Patent
Loesch et al.

(10) Patent No.: US 10,774,925 B2
(45) Date of Patent: Sep. 15, 2020

(54) DRIVE SYSTEM FOR DRIVING A COMPONENT HAVING AN ELECTRIC MOTOR UNIT AND A TRANSMISSION UNIT

(71) Applicant: Siemens Aktiengesellschaft, Munich (DE)

(72) Inventors: Christian Loesch, Erlangen (DE); Frank Anton, Erlangen (DE); Robert Goraj, Erlangen (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 0 days.

(21) Appl. No.: 16/313,857

(22) PCT Filed: Jun. 26, 2017

(86) PCT No.: PCT/EP2017/065712
§ 371 (c)(1),
(2) Date: Dec. 27, 2018

(87) PCT Pub. No.: WO2018/001962
PCT Pub. Date: Jan. 4, 2018

(65) Prior Publication Data
US 2019/0154140 A1 May 23, 2019

(30) Foreign Application Priority Data
Jun. 28, 2016 (DE) .................. 10 2016 211 559

(51) Int. Cl.
*F16H 57/08* (2006.01)
*F16H 57/02* (2012.01)
*H02K 7/116* (2006.01)

(52) U.S. Cl.
CPC .......... *F16H 57/082* (2013.01); *F16H 57/02* (2013.01); *F16H 57/08* (2013.01); *H02K 7/116* (2013.01);
(Continued)

(58) Field of Classification Search
None
See application file for complete search history.

(56) References Cited

U.S. PATENT DOCUMENTS 3,267,311 A * 8/1966 Lamparty ............... H02K 7/14
310/115
3,364,772 A 1/1968 Easton
(Continued)

FOREIGN PATENT DOCUMENTS

DE 3634894 A1 12/1987
DE 3641656 C2 8/1992
(Continued)

OTHER PUBLICATIONS

German Search Report for German Application No. 10 2016 211 559.6 dated May 24, 2017.
(Continued)

*Primary Examiner* — Justin Holmes
(74) *Attorney, Agent, or Firm* — Lempia Summerfield Katz LLC

(57) ABSTRACT

An electric motor equipped with a transmission unit in the form of a planetary gear transmission is provided. The planetary gear transmission has a sun gear, planetary gears, and a ring gear, which are coupled to one another via corresponding toothings. The sun gear is coupled directly to a shaft of the electric motor and is fastened thereto. The planetary gears or axles thereof are retained on a bearing plate of the electric motor. The ring gear is rotatably mounted on the housing of the electric motor or is fastened to the housing of the electric motor. A common feature is that parts of the transmission are retained on the housing of the electric motor and not on a separate housing or another component of the transmission unit.

8 Claims, 4 Drawing Sheets

(52) U.S. Cl.
    CPC .. *H02K 7/1163* (2013.01); *F16H 2057/02034* (2013.01); *F16H 2057/02086* (2013.01); *F16H 2057/085* (2013.01)

(56) References Cited

U.S. PATENT DOCUMENTS

| | | | |
|---|---|---|---|
| 5,649,879 A * | 7/1997 | Kusumoto | F02N 15/046 475/331 |
| 2005/0217418 A1 | 10/2005 | Dismon | |
| 2008/0169141 A1* | 7/2008 | Suzuki | B60K 7/007 180/65.7 |
| 2009/0295242 A1* | 12/2009 | Yamamoto | B60W 10/06 310/83 |
| 2010/0052442 A1* | 3/2010 | Savant | H02K 7/108 310/78 |
| 2011/0023640 A1 | 2/2011 | Hanson | |
| 2013/0049439 A1* | 2/2013 | Yamada | B60B 7/00 301/6.5 |
| 2017/0059003 A1* | 3/2017 | Wagh | F16H 1/46 |

FOREIGN PATENT DOCUMENTS

| | | |
|---|---|---|
| DE | 9311996 U1 | 12/1994 |
| DE | 102011005617 A1 | 9/2012 |
| EP | 1582776 A2 | 10/2005 |
| EP | 1905633 A1 | 4/2008 |
| EP | 3023630 A1 | 5/2016 |

OTHER PUBLICATIONS

PCT International Search Report and Written Opinion of International Searching Authority dated Sep. 8, 2017 corresponding to PCT International Application No. PCT/EP2017/065712 filed Jun. 26, 2017.

European Office Action for European Application No. 17 736 588.9-1012 dated May 6, 2020.

* cited by examiner

DRIVE SYSTEM FOR DRIVING A COMPONENT HAVING AN ELECTRIC MOTOR UNIT AND A TRANSMISSION UNIT

This application is the National Stage of International Application No. PCT/EP2017/065712, filed Jun. 26, 2017, which claims the benefit of German Patent Application No. 10 2016 211 559.6, filed Jun. 28, 2016. The entire contents of these documents are hereby incorporated herein by reference.

BACKGROUND

The present embodiments relate to a motor equipped with a transmission.

The power P of a motor may be described using $P=M*\omega$, where M denotes the torque of the motor and $w=2*\pi n$ denotes the angular speed at a rotational speed n of the motor. The power P may thus evidently be provided by a high torque M and/or a high rotational speed n.

Low-rotational-speed direct drives (e.g., drives that are operated at a low rotational speed n and are coupled directly to the component to be driven) exhibit a high torque and are operated at the same rotational speed as the component to be driven. These drives therefore have the advantage that the drives operate without an additional transmission. Owing to the demand for a high torque, these motors are, however, normally very heavy.

By contrast, in the case of high-rotational-speed motors, there is the advantage that a torque, which is indirectly proportional to the rotational speed, is sufficient for imparting the same power. In other words, the higher the rotational speed is selected to be, the lower is the torque required for imparting the same power. Since the torque is scaled with a factor that is dependent on the air gap diameter of the motor and the active length thereof (e.g., on the dimensions or on the size of the motor) and, as mentioned, in the case of high-rotational-speed motors, lower torques are sufficient for imparting the same power, it is possible for high-rotational-speed motors to be of relatively small construction, and the high-rotational-speed motors correspondingly take up less structural space and have a smaller mass.

In the case of these high-rotational-speed motors, there is, however, the disadvantage that these high rotational speeds are to be reduced again to the actually usable rotational speed by a corresponding transmission. Such a transmission is typically made up of a multiplicity of components (e.g., gearwheels, components for cooling, housing, screws, bearings, etc.). For this reason, the use of a transmission of the type consequently results in a significant additional mass. The actual mass advantage of the high-rotational-speed motor in relation to the direct drive may be lost again owing to the transmission that is possibly required and the associated additional mass.

A further difficulty of the high-rotational-speed motor lies in the fact that, in certain applications (e.g., in the case of wheel hub motors or propeller drives), it would be advantageous if the output side were situated at the outside, as in the case of an external-rotor motor. For example, in the case of high-rotational-speed motors, however, owing to the centrifugal forces that arise during rotational movements, there are limitations with regard to the practicable outer diameter of the rotating shaft and of the rotor. Thus, in these applications with an external rotor, it is necessary to forgo the weight advantage of the high-rotational-speed motor and adopt the heavier design of the external-rotor motor as a direct drive. It would alternatively be necessary, in this case, too, to use a transmission in combination with the high-rotational-speed motor, which, however, introduces an additional mass.

A transmission is typically mostly available as a separate component that is coupled to the motor by corresponding connections, attachments, and fits. As already indicated above, the various transmission components give rise to additional mass. A transmission generally has a flange or the like to which the unit to be driven, such as, for example, a propeller or a wheel, is coupled. The flange itself and the components associated therewith, such as, for example, bearings, various screws, housing, etc., in turn contribute, with corresponding masses, to the overall mass of the drive system, which ultimately has an adverse effect on the attainable power density.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a possibility for reducing the overall mass of a drive composed of a motor (e.g., a high-rotational-speed motor) and a transmission is provided.

A drive system according to an embodiment for driving a component has an electric motor unit for generating and providing a rotational movement with a first rotational frequency and a transmission unit for transferring the provided rotational movement to the component with a second rotational frequency is provided. The electric motor unit has a housing with at least one bearing plate that is arranged on a first axial end of the housing of the electric motor unit and on which a shaft of the electric motor unit is mounted. The shaft performs the rotational movement provided by the electric motor unit and itself provides the provided rotational movement. The transmission unit has a first gearwheel that is connected rotationally conjointly and directly to the shaft of the electric motor unit. The first gearwheel may be situated outside the motor housing. The transmission unit has at least one second gearwheel that is directly or indirectly coupled to the first gearwheel such that the second gearwheel co-rotates during rotation of the first gearwheel, where the second gearwheel may, for the transfer of the provided rotational movement, be coupled directly or indirectly to the component to be driven. Each of the second gearwheels is ultimately held on the housing of the electric motor unit (e.g., on a housing cover or bearing plate of the housing of the electric motor unit), such that the position of the respective second gearwheel in relation to the electric motor unit does not change even during the operation of the drive system.

The second gearwheel or the second gearwheels is or are held on the existing housing of the electric motor unit (e.g., on the bearing plate thereof) and not on a separate housing or on some other component of the transmission unit.

The expression "position" includes only, for example, the coordinates of the center of gravity of the respective gearwheel in a Cartesian or some other suitable coordinate system. The expression "position", however, does not encompass a possible rotation about the axis of rotation of the gearwheel. This is described using the expression "situation". In other words, the position of the gearwheel does not change when the gearwheel rotates, but the situation of the gearwheel does. By contrast, if the position of the gearwheel were to be changed but the gearwheel is not rotated in the process, it may be assumed that the "situation" remains unchanged.

This integration of electric motor unit and transmission unit is established in the case of the transmission unit being configured as a planetary gear transmission. A planetary gear transmission commonly has a sun gear, multiple planetary gears, and a ring gear, where the planetary gears are arranged in a radial direction between the sun gear and ring gear, and where toothings of the planetary gears mesh both with the toothing of the sun gear, which is driven by a shaft, and with the toothing of the ring gear. By contrast, the sun gear and ring gear are in contact with one another not directly but only indirectly via the planetary gears.

The abovementioned integration of electric motor unit and transmission unit is advantageous both in a first embodiment of the planetary gear transmission with stationary planetary gears and in a second embodiment with stationary ring gear. The shaft of the electric motor unit and the sun gear of the planetary gear transmission are situated radially in the center and are directly connected to one another. Since the electric motor unit and the planetary gear transmission require a housing part that accommodates the bearings and the planetary gearwheels, these two functions are now correspondingly combined.

In a first embodiment, the transmission unit is a planetary gear transmission with stationary planetary gears, where the first gearwheel of the transmission unit is the sun gear of the planetary gear transmission. Multiple second gearwheels that constitute the planetary gears of the planetary gear transmission (e.g., stationary planetary gears) and are each held on the housing of the electric motor unit (e.g., on the bearing plate of the housing of the electric motor unit) are provided, so as to be rotatable about respective stationary axes (e.g., so as to be variable in situation but in a stationary position). Respective central points are thus situated in a distributed manner over the circumference of a circular ring K having a central point that lies on an axis of rotation R of the first gearwheel and having a surface (e.g., the surface enclosed by the circular ring) that is perpendicular to the axis of rotation R of the first gearwheel. This arrangement of the second gearwheels or planetary gears is common in the case of a planetary gear transmission with stationary planetary gears. The transmission unit has a further rotatable gearwheel that is situated radially at the outside and constitutes the ring gear of the planetary gear transmission and is directly or indirectly coupled to the second gearwheels such that the further gearwheel co-rotates during rotation of the second gearwheels. The further gearwheel may, for the transfer of the provided rotational movement, be coupled directly or indirectly to the component to be driven. Accordingly, the second gearwheels are, in this embodiment, thus coupled indirectly to the component to be driven.

As is known, in the case of the planetary gear transmission with stationary planetary gears, the planetary gears rotate only about respective axes of rotation (e.g., during operation, the planetary gears change situation but not position). The further gearwheel or the ring gear surrounds the planetary gears and the sun gear in the center of the arrangement. During rotation of the sun gear, the ring gear is set in rotation via the planetary gears. The ring gear likewise maintains position but changes situation.

The further gearwheel or the ring gear is rotatably mounted by a bearing device attached to the housing of the electric motor unit (e.g., to the shell and/or to one of the bearing plates). The bearing device may, for example, have a bearing ring that is arranged so as to surround the housing along a circumference of the housing.

The ring gear situated at the outside now serves as an output with the correspondingly reduced rotational speed. The housing of the electric motor unit thus serves not only as a carrier for the components of the electric motor unit in the interior of the housing (e.g., stator and rotor), but additionally also as a carrier for the bearing for the rotation of the ring gear. This bearing, which bears the ring gear and permits the rotation thereof, is seated, for example, on the outer side of the electric motor unit, or may be attached to the bearing plate. Owing to the mounting on the housing of the electric motor unit, it is possible to dispense with additional devices for supporting the required bearing, and therefore, weight and structural space may be saved.

The bearing device has two or more bearing rings or the like that are positioned spaced apart from one another in an axial direction on the housing (e.g., on the housing shell) of the electric motor unit and so as to surround the housing along a circumference of the housing. This arrangement permits a rotation of the component to be driven about the electric motor unit, where the housing of the electric motor unit performs the role of the carrier that supports this rotation. The spacing between the bearing rings is then dependent, for example, on the dimension, in an axial direction, of the component to be driven.

At least two of the axles of the second gearwheels (e.g., the ends of the axles that are averted from the electric motor unit) are connected to one another by a circular-ring-shaped support ring, the central point of which lies on the axis of rotation of the further gearwheel. A surface of the circular-ring-shaped support ring is perpendicular to the axis of rotation of the further gearwheel. The further gearwheel or the ring gear is, additionally or alternatively to the mounting on the housing of the electric motor unit, mounted rotatably on the support ring by a bearing ring.

The abovementioned integration is likewise advantageous in the case of the transmission unit being embodied as a planetary gear transmission with stationary ring gear. In this case, too, the shaft of the electric motor unit and the sun gear of the planetary gear transmission are situated radially in the center and are directly connected to one another.

The bearing device attached to the housing of the electric motor unit is configured to support not only the ring gear but also the component to be driven, such that the component is consequently rotatable about the housing of the electric motor unit. A flange that is otherwise often required is thus omitted.

In a second embodiment, the transmission unit is a planetary gear transmission with rotating planetary gears and stationary ring gear. The first gearwheel of the transmission unit is again the central sun gear of the planetary gear transmission, whereas the second gearwheel constitutes the ring gear, situated radially at the outside, of the planetary gear transmission. The ring gear is held in a stationary (e.g., non-rotatable) manner (e.g., so as not to be variable in terms of situation) on the housing of the electric motor unit (e.g., the ring gear changes neither position nor situation). The transmission unit has multiple further gearwheels that are arranged between the sun gear and ring gear and constitute the planetary gears of the planetary gear transmission that couple the sun gear and the ring gear to one another. The further gearwheels are, for example, in the form of rotating planetary gears that are each arranged on the housing of the electric motor unit (e.g., on an axial end of the housing of the electric motor unit; on the bearing plate), such that corresponding central points are situated in a distributed manner over the circumference of a circular ring K having a central point that lies on an axis of rotation R of the first gearwheel and having a surface (e.g., the surface enclosed by the circular ring K) that is perpendicular to the axis of rotation R of the first gearwheel. The further gearwheels are mounted on the housing of the electric motor unit and directly or indirectly coupled to the first gearwheel such that the further gearwheels co-rotate about their respective axles (e.g., change situation) during rotation of the first gearwheel and such that, at the same time, during rotation of the first gearwheel, corresponding central points move along the circumference of the circular ring K (e.g., change position), such that the entirety of the further planetary gears performs a rotational movement about the axis of rotation of the sun gear. This rotational movement may be transmitted to the component.

Accordingly, the entirety of the second gearwheels is, in this embodiment, thus coupled directly to the component to be driven. This arrangement of the further gearwheels or of the planetary gears is common in the case of a planetary gear transmission with stationary ring gear. The planetary gears are variable both in terms of position and in terms of situation, whereas, for the ring gear, position and situation are invariable.

In a known manner, in the case of the planetary gear transmission with stationary ring gear, the planetary gears perform both a rotational movement about respective own axles and at the same time a change in position along the circumference of the circular ring. The ring gear is stationary and, during the operation of the transmission, changes neither position nor situation, by contrast to the planetary gear transmission with stationary planetary gears. During rotation of the sun gear, the planetary gears are themselves set in rotation about corresponding axles and, in effect, roll on the ring gear that, radially at the outside, surrounds the arrangement composed of the central sun gear and the planetary gears surrounding the sun gear. The axles of the planetary gears are guided along the circumference of the circular ring by corresponding guides or bearings, etc.

On the housing of the electric motor unit (e.g., on one axial end; on the bearing plate), a guide device by which the ends of the axles of the further gearwheels that face toward the electric motor unit may be guided is provided, such that, during rotation of the first gearwheel, the central points of the further gearwheels move along the circumference of the circular ring.

The guide device includes a ring-shaped web that is fastened to the housing of the electric motor unit (e.g., to the shell and/or to one of the bearing plates) and has a bearing ring and a holding ring. The holding ring is mounted on the bearing ring so as to be rotatable about the axis of rotation of the first gearwheel. The ends of the axles of the further gearwheels that face toward the electric motor unit are also fastened to the holding ring, such that the holding ring co-rotates during a rotation of the entirety of the further gearwheels about the axis of rotation R.

This embodiment of the guide device with parts arranged on the housing of the electric motor unit constitutes a further advantageous aspect of the integration of electric motor unit and transmission unit.

A transfer device is fastened to the ends of the axles of the further gearwheels that are averted from the electric motor unit. The transfer device is couplable to the component to be driven in order to transmit the rotational movement to the component.

The holding ring of the guide device may be the transfer device, such that, in turn, owing to the multiple function of the holding ring, the degree of integration may be increased.

In a third embodiment, the transmission unit is configured as a spur-gear transmission. The spur-gear transmission has a first, drive-side spur gear and a second, output-side spur gear, where the first gearwheel of the transmission unit constitutes the first, drive-side spur gear and the second gearwheel constitutes the second, output-side spur gear. The second gearwheel is held on the housing of the electric motor unit so as to be rotatable about its stationary axle (e.g., so as to be variable in situation but in a stationary position).

Mass is reduced through functional integration of the transmission components into and onto the motor housing. By this integration, the motor may consequently be operated as a "quasi-external-rotor motor".

An unconventional integration and combination of the transmission components into and onto the electric motor are provided. The mass advantage of high-rotational-speed motors may be further improved by jointly utilizing functional parts such as, for example, housing components for the transmission and the electric motor and thus saving numerous otherwise separate components. Also, the connecting elements that are otherwise required are omitted.

The design advantages of the high-rotational-speed motor may be utilized, and an overall drive concept with very high power densities, typically measured in kW/kg, is realized. For example, for air travel based on electric drives, power densities in a range of 25 kW/kg are provided, and one of several approaches, which may also be combined with one another, for correspondingly increasing the power density is provided.

BRIEF DESCRIPTION OF THE DRAWINGS

In the drawings, same components in different figures are denoted by the same reference designations.

DETAILED DESCRIPTION

The same reference designations are used in different figures to denote same components. Expressions such as "axial", "radial", "circumferential direction", etc. relate to the shaft or axle used in the respective figure or in the respectively described example.

The expression "position includes only, for example, the coordinates of the center of gravity of the respective gearwheel in a Cartesian or some other suitable coordinate system. The expression "position", however, does not encompass a possible rotation about the axis of rotation of the respective gearwheel. This is described using the expression "situation". In other words, the position of the gearwheel does not change when the gearwheel rotates, but the situation of the gearwheel does. By contrast, if the position of the gearwheel were to be changed but the gearwheel is not rotated in the process, it may be assumed that the situation remains unchanged.

For the sake of clarity, the toothings of the various gearwheels are not illustrated.

Figure 1:
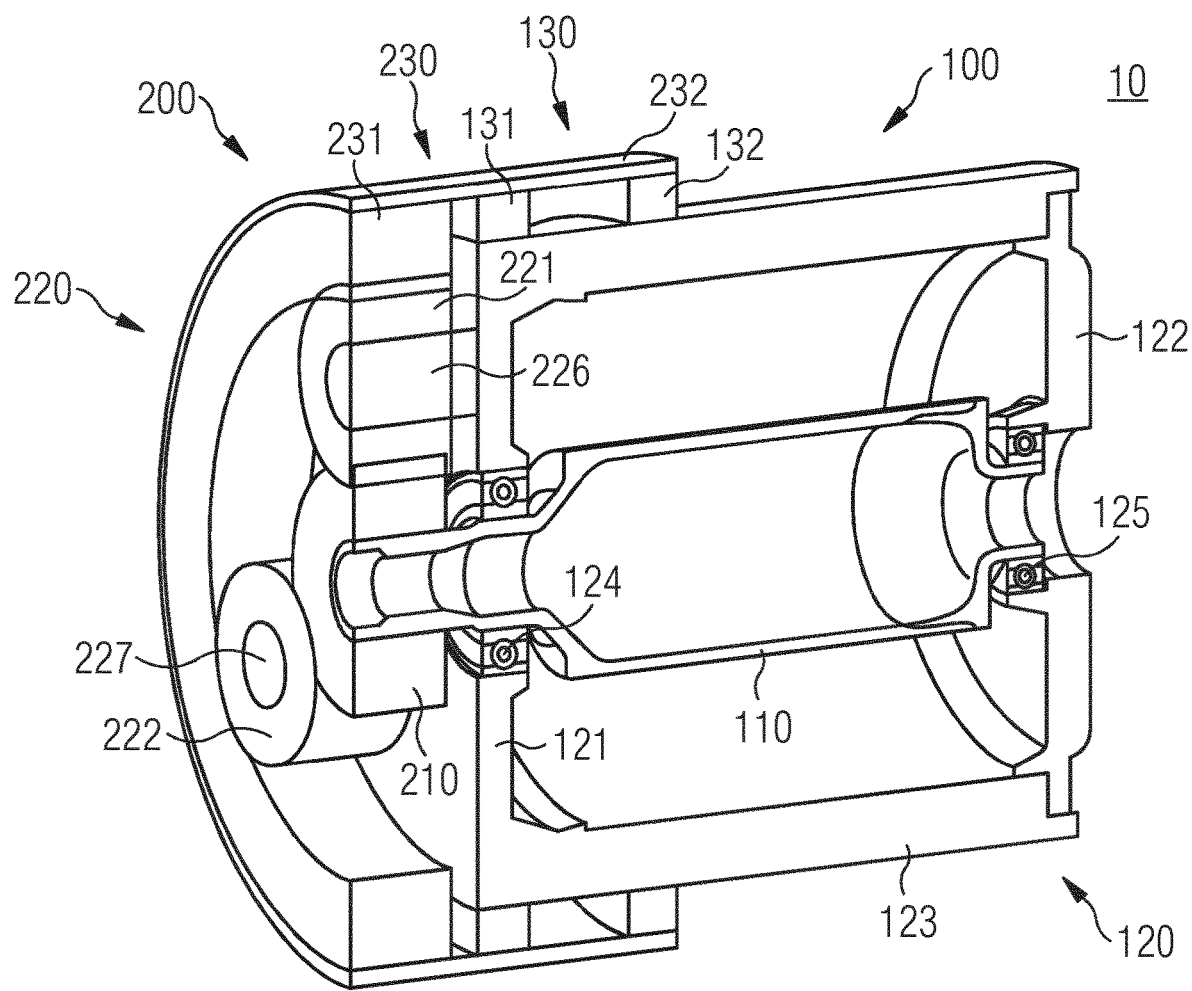
FIG. 1 shows a first embodiment of a drive system having a transmission unit configured as a planetary gear transmission with stationary planetary gears and rotatable ring gear.

FIG. 1 shows a perspective sectional illustration of a first embodiment of a drive system 10 having an electric motor unit 100 and a transmission unit 200.

For the sake of clarity, in FIG. 1 and in the other figures, some components of the electric motor unit 100, which are required for the actual operation thereof but do not play a role in the description of the invention, are not illustrated in the figures. This relates, for example, to a rotor and a stator of the electric motor unit and electrical terminals via which electrical currents may be conducted to coils (likewise not illustrated) of the stator. These components are typically situated in or on the housing 120 of the electric motor unit 100 and have the effect that a torque generated owing to an electromagnetic interaction between stator and rotor is transmitted to a shaft 110 of the electric motor unit 100. The electric motor unit 100 thus generates a rotational movement with a first rotational frequency or rotational speed, which rotational movement is, by the shaft 110, provided for further use outside the electric motor unit 100 (e.g., for the purposes of driving a component to be driven; a propeller or a wheel).

The housing 120 of the electric motor unit 100 is composed substantially of two housing covers 121, 122 arranged on the axial ends of the housing 120. The housing 120 covers may, for example, be configured as bearing plates 121, 122. Such bearing plates 121, 122 firstly protect the housing 120, and, for example, the interior thereof, against contamination and/or contact, and secondly support the bearings 124, 125 of the ends of the shaft 110. Each of the bearing plates 121, 122 may be a separate part or else may be manufactured together with the housing 120 from one block (e.g., as a "pot" as illustrated in the figures).

In the example illustrated, the bearing plate 121 is situated on the output side of the electric motor unit 100, on which the transmission unit 200, which is described below, is also situated. In addition to the housing covers 121, 122 or bearing plates 121, 122, the housing 120 has a housing shell 123 that extends in an axial direction between the housing covers or bearing plates 121, 122. The housing shell 123 together with the bearing plates 121, 122 forms substantially a cylindrical housing 120 that is closed off in an axial direction by the bearing plates 121, 122 and in a radial direction by the housing shell 123.

The function of the transmission unit 200 consists in converting the rotational movement provided by the electric motor unit 100 or by the shaft 110 thereof to a second rotational frequency or rotational speed, and transferring this rotational movement directly or indirectly to the component to be driven. The second rotational frequency may be lower than the first rotational frequency, because the electric motor unit is ideally operated with a high frequency or rotational speed. For example, the electric motor unit may be operated at a first rotational speed of 1500 revolutions per minute, whereas a second rotational speed in the region of 2500 revolutions per minute is required for the component (e.g., a propeller).

Figure 2:
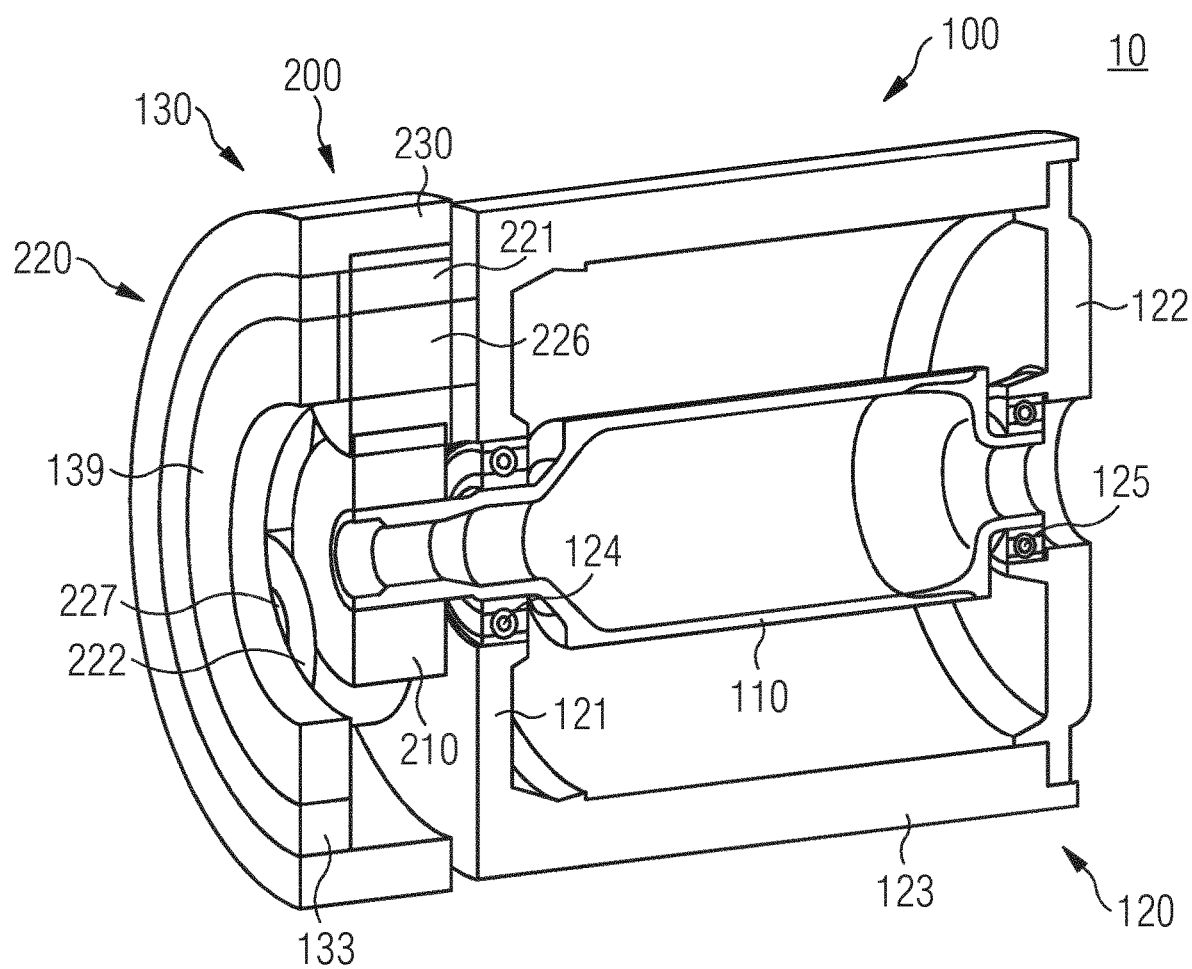
FIG. 2 shows a variant of the first embodiment.
Figure 3:
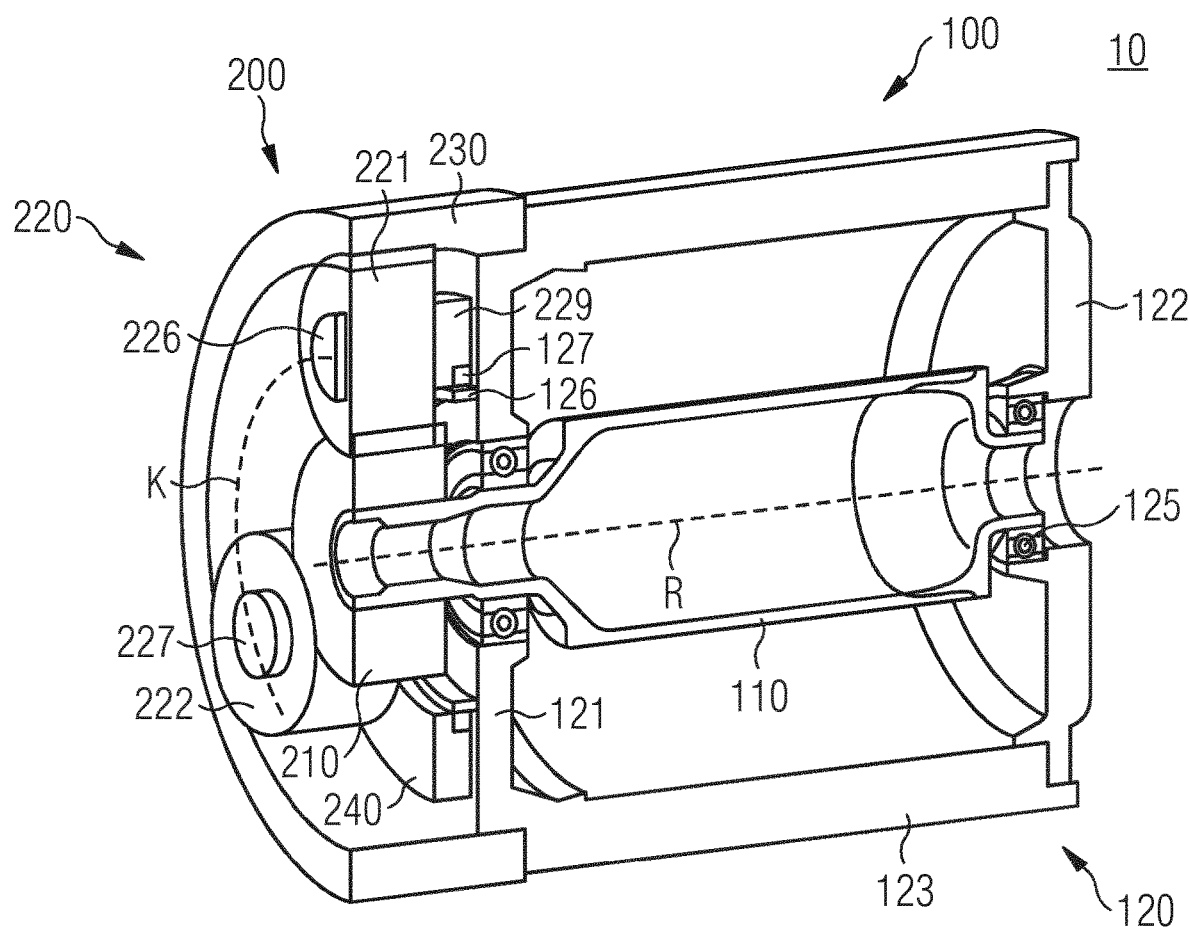
FIG. 3 shows a second embodiment of the drive system with planetary gear transmission with rotating planetary gears and stationary, non-rotatable ring gear.

In the figures, the transmission unit 200 will be discussed in various embodiments as a planetary gear transmission or as a spur-gear transmission. A planetary gear transmission may have a sun gear, multiple planetary gears, and a ring gear, where the planetary gears are arranged in a radial direction between the sun gear and ring gear. Toothings of the planetary gears mesh both with the toothing of the sun gear, which is driven by a shaft, and with the toothing of the ring gear. The intermeshing of the various toothings gives rise to a direct coupling of the respective gearwheels, such that rotations may be transferred between the coupled gearwheels. Sun gear and ring gear, or the toothings thereof, are not directly in contact with one another but coupled indirectly to one another via the planetary gears. In the case of the planetary gear transmission with stationary planetary gears, as illustrated in FIGS. 1 and 2, the planetary gears are variable only in situation but not in position. In other words, the planetary gears may rotate about their axle but always remain at the same position relative to the drive system 10. In the alternative embodiment of the planetary gear transmission with stationary ring gear, as illustrated in FIG. 3, the ring gear is configured as a stationary gearwheel, which does not rotate during the operation of the transmission, whereas the planetary gears change both situation and position.

In the first embodiment of the drive system 10 illustrated in FIG. 1, the transmission unit 200 is configured as a planetary gear transmission with stationary planetary gears.

Specifically, the transmission unit 200 or the planetary gear transmission 200 has a first gearwheel 210 that is connected rotationally conjointly and directly to the shaft 110 of the electric motor unit 100 such that the first gearwheel 210 co-rotates during rotation of the shaft 110. The first gearwheel 210 of the transmission unit 200 constitutes the sun gear 210 of the transmission unit 200 configured as planetary gear transmission.

The planetary gear transmission 200 has a group 220 with multiple second gearwheels 221, 222. It is to be assumed that the group 220 includes not only the illustrated two second gearwheels 221, 222 but also at least one additional second gearwheel, which is, however, not illustrated because the corresponding part of the drive system 10 is not included in the figure owing to the sectional illustration. The second gearwheels 221, 222 constitute the planetary gears of the planetary gear transmission 200 and are directly coupled to the first gearwheel 210 such that the second gearwheels 221, 222 co-rotate (e.g., change situation) during rotation of the first gearwheel 210.

The second gearwheels 221, 222 or the planetary gears 221, 222 are held on the housing 120 of the electric motor unit 100, and, for example, on the first bearing plate 121, so as to be rotatable about a respective axle 226, 227 such that the position of the respective second gearwheel 221, 222 in relation to the drive system 10 does not change even during the operation of the drive system 10. The planetary gear transmission 200 may therefore also be referred to as planetary gear transmission with stationary planetary gears 221, 222. The planetary gears 221, 222 of the group 220 of second planetary gears are held on the bearing plate 121 such that central points are situated in a regularly distributed manner over the circumference of a circular ring K (e.g., are evenly distributed). This imaginary circle K is arranged such that a central point of the imaginary circle K lies on the axis of rotation of the first gearwheel 210 and such that a surface (e.g., the surface enclosed by the circle) is perpendicular to the axis of rotation of the first gearwheel 210.

The gearwheels 221, 222 of the group 220 of second gearwheels are held on the existing housing 120 of the electric motor unit 100, for example, on the bearing plate 121 thereof, and not on a separate housing or some other component of the transmission unit 200.

The planetary gear transmission 200 also includes a further rotatable gearwheel 230 that constitutes the ring gear of the planetary gear transmission 200. The ring gear 230 is, by toothing (not illustrated), directly coupled to the second gearwheels 221, 222 of the group 220 such that the ring gear 230 co-rotates during rotation of the second gearwheels 221, 222 or of the planetary gears 221, 222. For this purpose, the ring gear 230 is, by a bearing device 130, mounted rotatably on the electric motor unit 100. The ring gear 230 has, for example, a toothing section 231, in which the toothing is situated, and a bearing section 232, by which the ring gear 230 is mounted on the bearing device 130.

The bearing device 130 includes a first bearing ring 131 that is arranged radially at the outside on the shell 123 of the housing 120 of the electric motor unit 100 and about which the ring gear 230 may rotate. The first bearing ring 131 extends along the circumference of the housing 120 or of the shell 123 and is, in an axial direction, arranged, for example, in the region of the first bearing plate 121.

In the case of the planetary gear transmission 200 with fixed planetary gears 221, 222, the ring gear 230 may, for the transfer of the provided rotational movement, be coupled directly or possibly indirectly to the component to be driven. The bearing device 130 attached to the housing 120 of the electric motor unit 100 may be configured or dimensioned such that the bearing device 130 may support not only the ring gear 230 but also the component to be driven, such that the component to be driven is consequently rotatable about the housing 120 of the electric motor unit 100. A flange that is otherwise often required for the connection of the component to the transmission unit 200 is thus omitted.

The bearing device 130 may also have a second bearing ring 132 that is positioned, so as to be spaced apart in an axial direction from the first bearing ring 131, on the housing 120 of the electric motor unit 100, and so as to surround the housing 120 or the shell 123 thereof along a circumference. The second bearing ring 132 is arranged coaxially with respect to the first bearing ring 131 and is situated in an axial direction between the first bearing ring 131 and the second bearing plate 122. The bearing section 232 of the ring gear 230 accordingly extends in an axial direction to such an extent that the bearing section 232 covers both bearing rings 131, 132.

Specifically, the bearing device 130 with the two bearing rings 131, 132 and possibly even additional bearing rings is particularly suitable for the mounting not only of the ring gear 230 but also of the component to be driven. This arrangement permits a rotation of the component to be driven about the electric motor unit 100, where the housing 120 of the electric motor unit 100 performs the role of the carrier that supports the rotation. The spacing between the bearing rings 131, 132 and thus also the axial extent of the bearing section 232 of the ring gear 230 is then dependent, for example, on the dimension of the component to be driven in an axial direction.

For the mounting of the ring gear 230 and possibly for the mounting of the component to be driven, the bearing device 130 may, additionally or alternatively to the one or more bearing rings 131, 132, for example, have a bearing ring 133 that is arranged on a circular-ring-shaped device or a support ring 139 that is fastened to and supported by the axles 226, 227 of the stationary second gearwheels 221, 222. FIG. 2 illustrates that variant of the bearing device 130 in which the bearing ring 133 is provided not additionally but alternatively to the two bearing rings 131, 132 already discussed. At least two of the axles 226, 227 of the second gearwheels 221, 222 are connected to one another via the support ring 139 such that the central point of the support ring 139 lies on the axis of rotation of the ring gear 230 and such that the plane defined by the ring 139 is perpendicular to the axis of rotation of the ring gear 230. Since the second gearwheels 221, 222 or planetary gears 221, 222 are stationary in the embodiment of the planetary transmission 200 illustrated in FIGS. 1 and 2, the support ring 139, and with it the bearing ring 133 arranged on the bearing ring 139, is also stationary and serves for the mounting of the ring gear 230.

FIG. 3 shows a perspective sectional illustration of a second embodiment of the drive system 10 with electric motor unit 100 and transmission unit 200. The electric motor unit 100 corresponds substantially to that of the first embodiment.

In the second embodiment illustrated in FIG. 3 that the transmission unit 200 is configured as a planetary gear transmission with a sun gear 210, a group 220 of planetary gears 221, 222, and a ring gear 230, where the planetary gears 221, 222 are arranged in a radial direction between sun gear 210 and ring gear 230, and where toothings of the planetary gears 221, 222 mesh both with the toothing of the sun gear 210 driven by the shaft 110 and with the toothing of the ring gear 230.

In the second embodiment of the drive system 10 illustrated in FIG. 3, the planetary transmission 200 is configured with rotating planetary gears 221, 222 and with a stationary, non-rotatable ring gear 230.

The planetary gear transmission 200 has, as sun gear, a first gearwheel 210 that is connected rotationally conjointly and directly to the shaft 110 of the electric motor unit 100, such that the first gearwheel 210 co-rotates during rotation of the shaft 110.

The planetary gear transmission 200 has, as ring gear, a second gearwheel 230 that is fastened in a static and non-rotatable manner to the housing 120 of the electric motor unit 100. Accordingly, neither the situation nor the position of the ring gear 230 is variable. For example, the ring gear 230 may be fastened to the housing shell 123. A fastening to the housing cover or bearing plate 121 may, however, also be provided.

The planetary gear transmission 200 has a group 220 with multiple further gearwheels 221, 222. For the second embodiment, too, it is to be assumed that the group 220 includes not only the illustrated two further gearwheels 221, 222 but also at least one additional further gearwheel, which is, however, not illustrated because the corresponding part of the drive system 10 is not included in the figure owing to the sectional illustration. The further gearwheels 221, 222 constitute the planetary gears of the planetary gear transmission 200 and are rotatable about respective axles 226, 227. The planetary gears 221, 222 are arranged such that respective central points or their axles 226, 227 are evenly distributed over the circumference of a circular ring K having a central point that lies on an axis of rotation R of the sun gear 210 and having a surface (e.g., the surface enclosed by the circular ring) that is perpendicular to the axis of rotation R.

The planetary gears 221, 222 are directly coupled to the sun gear 210 so as to co-rotate about respective axles 226, 227 (e.g., change a situation) during rotation of the sun gear 210. The planetary gears 221, 222 are also directly coupled to the stationary ring gear 230 such that, during rotation of the sun gear 210, the further gearwheels 221, 222 must not only rotate about the respective axles 226, 227 (e.g., change the situation), but also move along a circumference of the circular ring K, and thus change position.

For this purpose, the planetary gears 221, 222 are mounted on the housing 120 of the electric motor unit 100, and coupled to the sun gear 210, such that, during rotation of the sun gear 210, the planetary gears 221, 222 co-rotate about respective axles 226, 227 and, at the same time, during rotation of the sun gear 210, respective central points may move along the circumference of the circular ring K, such that the entirety of the planetary gears 221, 222 performs a rotational movement about the axis of rotation of the sun gear 210. This rotational movement of the entirety of the planetary gears 221, 222 may ultimately be transferred to the component in order to drive the component.

To permit this, it is, for example, possible for those ends of the axles 226, 227 of the planetary gears 221, 222 that face toward the electric motor unit 100 to be capable of being guided by a corresponding guide device. The guide device includes a ring-shaped web 126 that is attached to the housing 120 of the electric motor unit 100 (e.g., to the bearing plate 121) with a bearing ring 127. The guide device also includes a holding ring 229 that is mounted rotatably on the bearing ring 127 and to which the ends of the axles 226, 227 of the planetary gears 221, 222 that face toward the electric motor unit 100 are fastened. The web 126, the bearing ring 127, and the holding ring 229 are arranged concentrically with respect to the axis of rotation R of the sun gear 210. Thus, during rotation of the sun gear 210, the central points of the planetary gears 221, 222 may move in a guided manner along the circumference of the circular ring K.

To transfer the rotational movement of the entirety of the planetary gears 221, 222 about the axis of rotation R to the component to be driven, a transfer device 240 is connected to the planetary gears 221, 222 or, for example, to the axles 226, 227 thereof. In the simplest case, the holding ring 229 that has already been introduced, and which co-rotates during rotation of the sun gear 210, itself constitutes the transfer device 240. In this case, the holding ring 229 has corresponding devices for the coupling-on of the component to be driven (e.g., for the introduction of screws).

Figure 4:
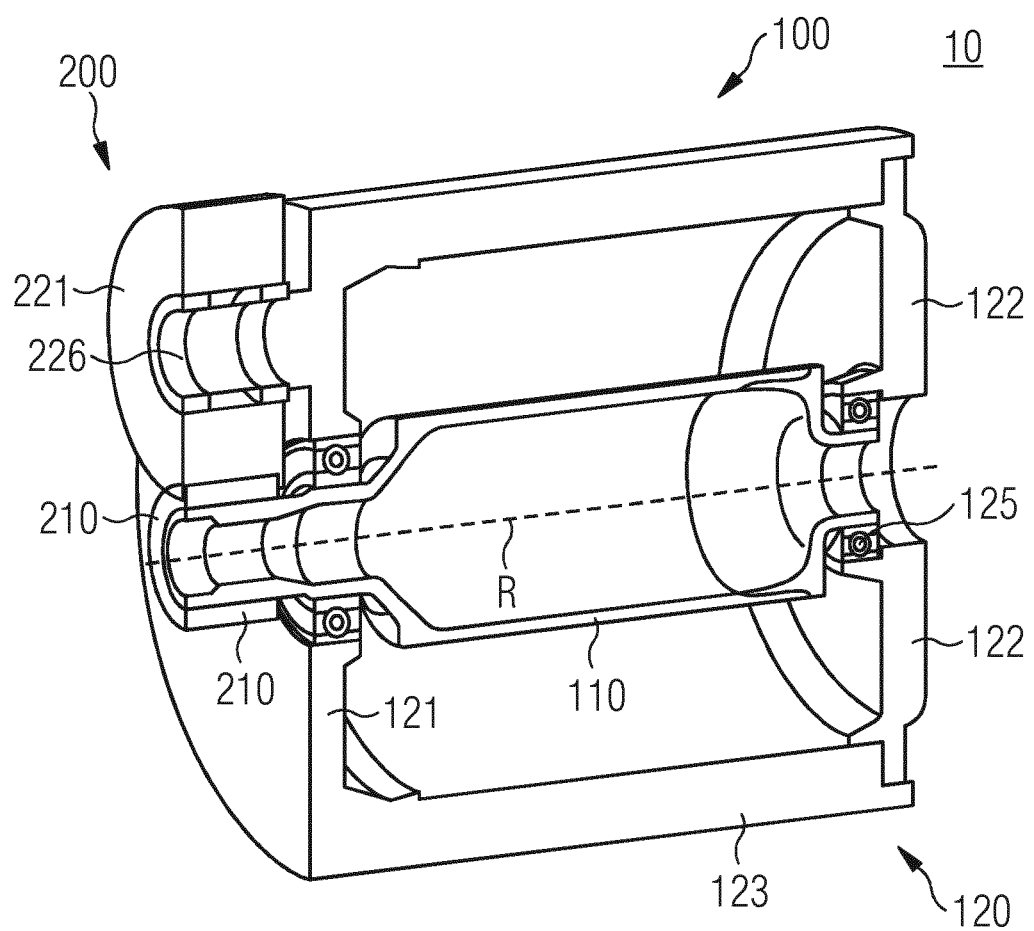
FIG. 4 shows a third embodiment of the drive system with a transmission unit configured as a spur-gear transmission.

FIG. 4 shows a perspective sectional illustration of a third embodiment of the drive system 10 with electric motor unit 100 and transmission unit 200. The transmission unit 200 is, in the third embodiment, configured as a spur-gear transmission. The electric motor unit 100 corresponds substantially to that of the first and second embodiments.

The spur-gear transmission 200 has a first gearwheel 210 that is connected rotationally conjointly and directly to the shaft 110 of the electric motor unit 100, such that the first gearwheel 210 co-rotates as the shaft 110 rotates. The spur-gear transmission 200 has a second gearwheel 221 that is held on the housing 120 of the electric motor unit 100 (e.g., on the housing cover or bearing plate 121 of the housing 120), so as to be rotatable about a corresponding fixed axle 226 (e.g., so as to be variable in situation but in a fixed position). For example, the axle 226 may itself be fastened to the bearing plate 121. The first gearwheel 210 and the second gearwheel 221 are arranged relative to one another such that the second gearwheel 221 is coupled directly to the first gearwheel 210. The second gearwheel 221 thus co-rotates (e.g., changes a situation but not a position) during rotation of the shaft 110 and of the first gearwheel 210. The second gearwheel 221 may now be connected in a known manner directly or indirectly to the component to be driven.

The first gearwheel 210 and the other components of the transmission unit 200 may, in all embodiments, be situated outside the housing 120 of the electric motor unit 100. The gearwheels may, however, also be accommodated in an additional housing, because the gearwheels are, for example, to be lubricated and cooled by immersion lubrication and protected against dirt from the surroundings.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A drive system for driving a component, the drive system comprising:

an electric motor unit configured to provide a rotational movement with a first rotational speed; and a transmission unit configured to transfer the provided rotational movement to the component with a second rotational speed, wherein the electric motor unit comprises a housing with at least one bearing plate that is arranged on a first axial end of the housing of the electric motor unit and on which a shaft of the electric motor unit is mounted, the shaft being configured to perform and provide the provided rotational movement, wherein the transmission unit is a planetary gear transmission comprising:

a first gearwheel that is a sun gear and is connected rotationally conjointly and directly to the shaft of the electric motor unit;

multiple second gearwheels that constitute planetary gears, the multiple second gearwheels being coupled to the first gearwheel such that the multiple second gearwheels co-rotate during rotation of the first gearwheel, the multiple second gearwheels each being held, so as to be rotatable about respective axles, on the housing of the electric motor unit such that respective central points are situated in a distributed manner over a circumference of a circular ring having a central point that lies on an axis of rotation of the first gearwheel and having a surface that is perpendicular to the axis of rotation of the first gearwheel; and a third gearwheel that is rotatable and constitutes a ring gear of the planetary gear transmission, the third gearwheel being coupled to the multiple second gearwheels such that the third gearwheel co-rotates during rotation of the multiple second gearwheels, wherein the multiple second gearwheels, for the transfer of the provided rotational movement, are coupleable to the component to be driven, wherein each of the second gearwheels is held on the housing of the electric motor unit such that a position of the respective second gearwheel on the housing does not change, wherein the third gearwheel, for the transfer of the provided rotational movement, is coupleable to the component to be driven, wherein the third gearwheel is rotatably mounted by a bearing device attached to the housing of the electric motor unit, the bearing device having a bearing ring that is arranged so as to surround the housing of the electric motor unit along a circumference of the housing of the electric motor unit.

2. The drive system of claim 1, wherein the bearing ring is a first bearing ring, and
wherein the bearing device also has a second bearing ring, the first bearing ring and the second bearing ring being positioned spaced apart from one another in an axial direction on the housing of the electric motor unit and so as to surround the housing of the electric motor unit along the circumference of the housing of the electric motor unit.

3. The drive system of claim 1, wherein at least two axles of the multiple second gearwheels are connected to one another by a ring-shaped support ring, a central point of which lies on the axis of rotation of the third gearwheel and a surface of which is perpendicular to the axis of rotation of the third gearwheel, and
wherein the third gearwheel is mounted rotatably on the support ring.

4. The drive system of claim 1, wherein the bearing device attached to the housing of the electric motor unit is configured to support not only the ring gear but also the component to be driven.

5. A drive system for driving a component, the drive system comprising:
an electric motor unit configured to provide a rotational movement with a first rotational speed; and
a transmission unit configured to transfer the provided rotational movement to the component with a second rotational speed,
wherein the electric motor unit comprises a housing with at least one bearing plate that is arranged on a first axial end of the housing of the electric motor unit and on which a shaft of the electric motor unit is mounted, the shaft being configured to perform and provide the provided rotational movement,
wherein the transmission unit is a planetary gear transmission comprising:
a first gearwheel that is a sun gear and is connected rotationally conjointly and directly to the shaft of the electric motor unit;
a second gearwheel that constitutes a ring gear and is coupled to the first gearwheel, the second gearwheel being held in a stationary manner on the housing of the electric motor unit; and
multiple third gearwheels that are arranged between the first gearwheel and the second gearwheel, the multiple third gearwheels constituting planetary gears,
wherein the multiple third gearwheels are each arranged on the housing of the electric motor unit such that respective central points are situated in a distributed manner over a circumference of a circular ring having a central point that lies on an axis of rotation of the first gearwheel and having a surface that is perpendicular to the axis of rotation of the first gearwheel,
wherein the multiple third gearwheels are mounted on the housing of the electric motor unit and coupled to the first gearwheel such that the multiple third gearwheels co-rotate about respective axles during rotation of the first gearwheel and such that, at the same time, during rotation of the first gearwheel, respective central points move along the circumference of the circular ring, such that an entirety of the multiple third gearwheels performs a rotational movement that is transmittable to the component, and
wherein the drive system further comprises a guide device provided on the housing of the electric motor unit, ends of the axles of the multiple third gearwheels that face toward the electric motor unit being guidable by the guide device, such that, during rotation of the first gearwheel, the central points of the multiple third gearwheels move along the circumference of the circular ring.

6. The drive system of claim 5, wherein the guide device has a ring-shaped web that is fastened to the housing of the electric motor unit and has a bearing ring and a holding ring,
wherein the holding ring is mounted on the bearing ring so as to be rotatable about the axis of rotation of the first gearwheel, and
wherein the axles of the further gearwheels are fastened to the holding ring.

7. The drive system of claim 6, further comprising a transfer device that is fastened to the axles of the multiple third gearwheels, the transfer device being couplable to the component to be driven in order to transmit the rotational movement to the component.

8. The drive system of claim 7, wherein the holding ring is the transfer device.

* * * * *